Nov. 25, 1958 R. C. RUSSELL 2,861,476
POWER TRANSMISSION MECHANISMS
Filed March 13, 1957 3 Sheets-Sheet 1

INVENTOR.
ROBERT C. RUSSELL
BY Hudson, Brighton,
Williams, David & Hoffmann
ATTORNEYS

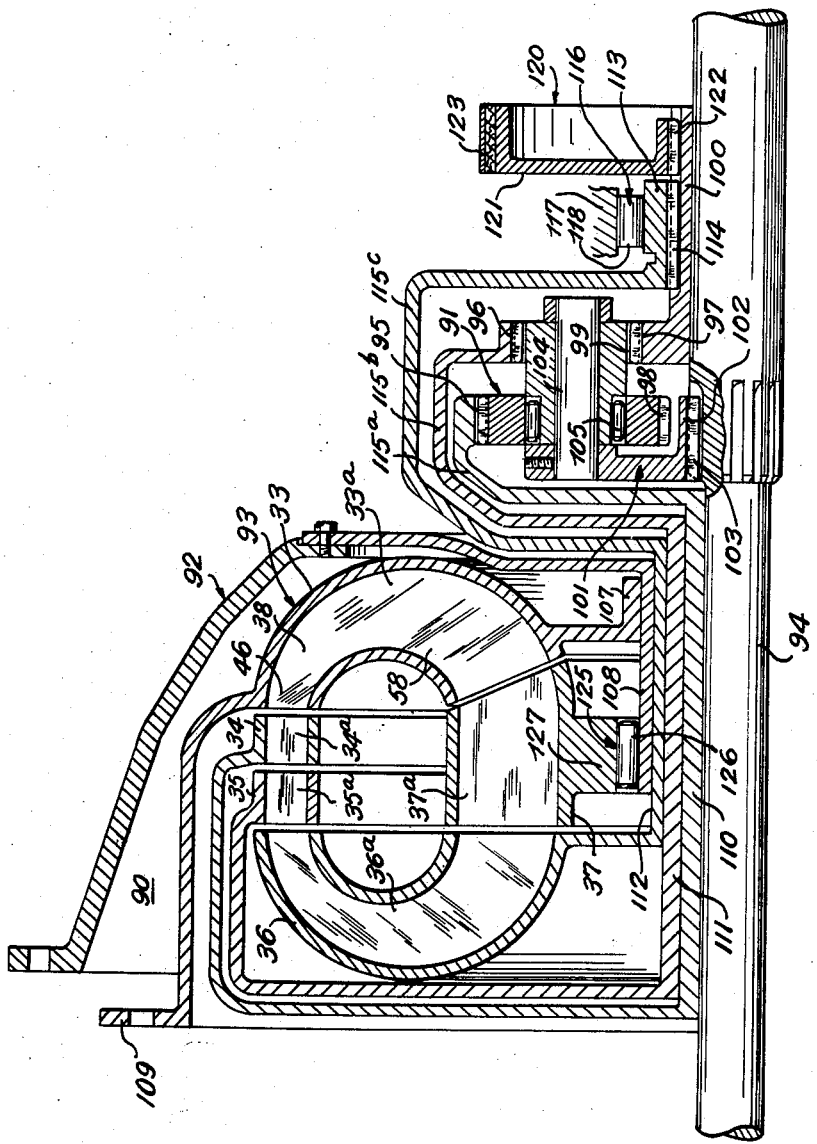

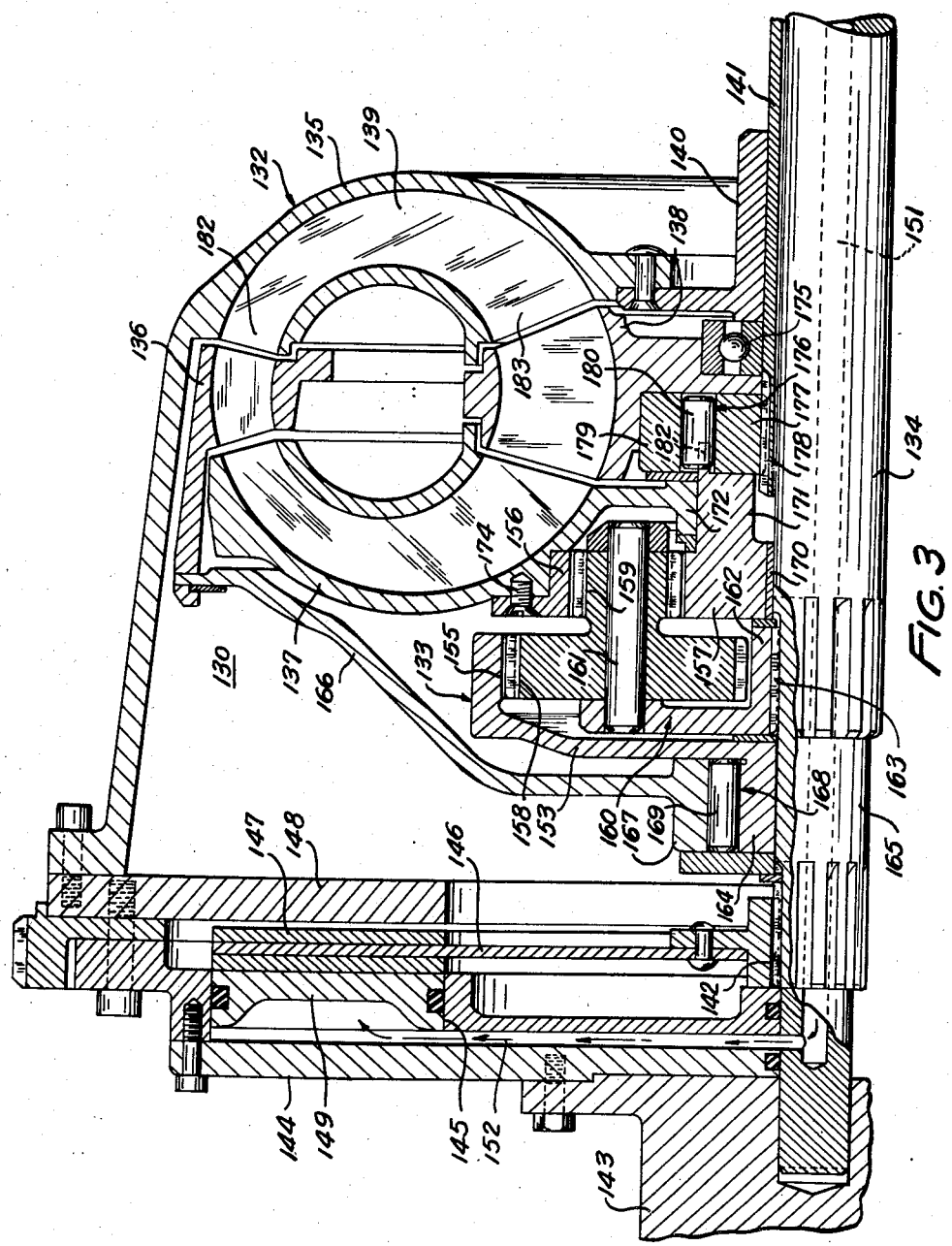

United States Patent Office 2,861,476
Patented Nov. 25, 1958

2,861,476

POWER TRANSMISSION MECHANISMS

Robert C. Russell, Shaker Heights, Ohio, assignor to Eaton Manufacturing Company, Cleveland, Ohio, a corporation of Ohio Application March 13, 1957, Serial No. 645,690

16 Claims. (Cl. 74—688)

This invention relates to power transmission mechanisms of the combined rotary fluid torque converter and mechanical gear train type and, as one of its objects, aims to provide a multiple turbine form of such a transmission for automobile and other vehicle use in which a high value of torque amplification will be obtainable for the starting or stall condition of operation and in which torque amplification will take place at varying values throughout a desired wide range of operating speeds.

Another object is to provide such a multiple-turbine form of combined torque converter and mechanical gear train transmission in which a highly effective fluid coupling is obtainable for engine braking of vehicle momentum.

Still another object is to provide a transmission mechanism of the kind above referred to in which the gear means transmits torque from bladed annular members of the torque converter unit to an output means at different ratios, and in which the gear means comprises interconnected planetary gear trains and is at times referred to herein as a compound planetary gear system.

As a further object, this invention provides a transmission mechanism of the kind mentioned above in which the planetary gear system includes ring gears and a sun gear means, and in which the bladed annular members of the torque converter unit comprise a pump means, primary and secondary turbines connected to drive the respective ring gears, and a fourth bladed annular member located in contiguous relation to the secondary turbine and connected to the sun gear means.

Additionally, this invention provides such a combined torque converter and planetary gear system type of transmission in which the bladed annular members include a third turbine and a reaction means disposed between the third turbine and the inlet portion of the pump means.

The invention can be further briefly summarized as consisting in certain novel combinations and arrangements of parts hereinafter described in detail and particularly set out in the claims hereof.

In the accompanying sheets of drawings forming a part of this specification

Fig. 2 is a vertical axial section of another such transmission mechanism and showing the same in a somewhat diagrammatic form; and Fig. 3 is a vertical axial section showing still another such transmission mechanism of this invention.

Figure 1:
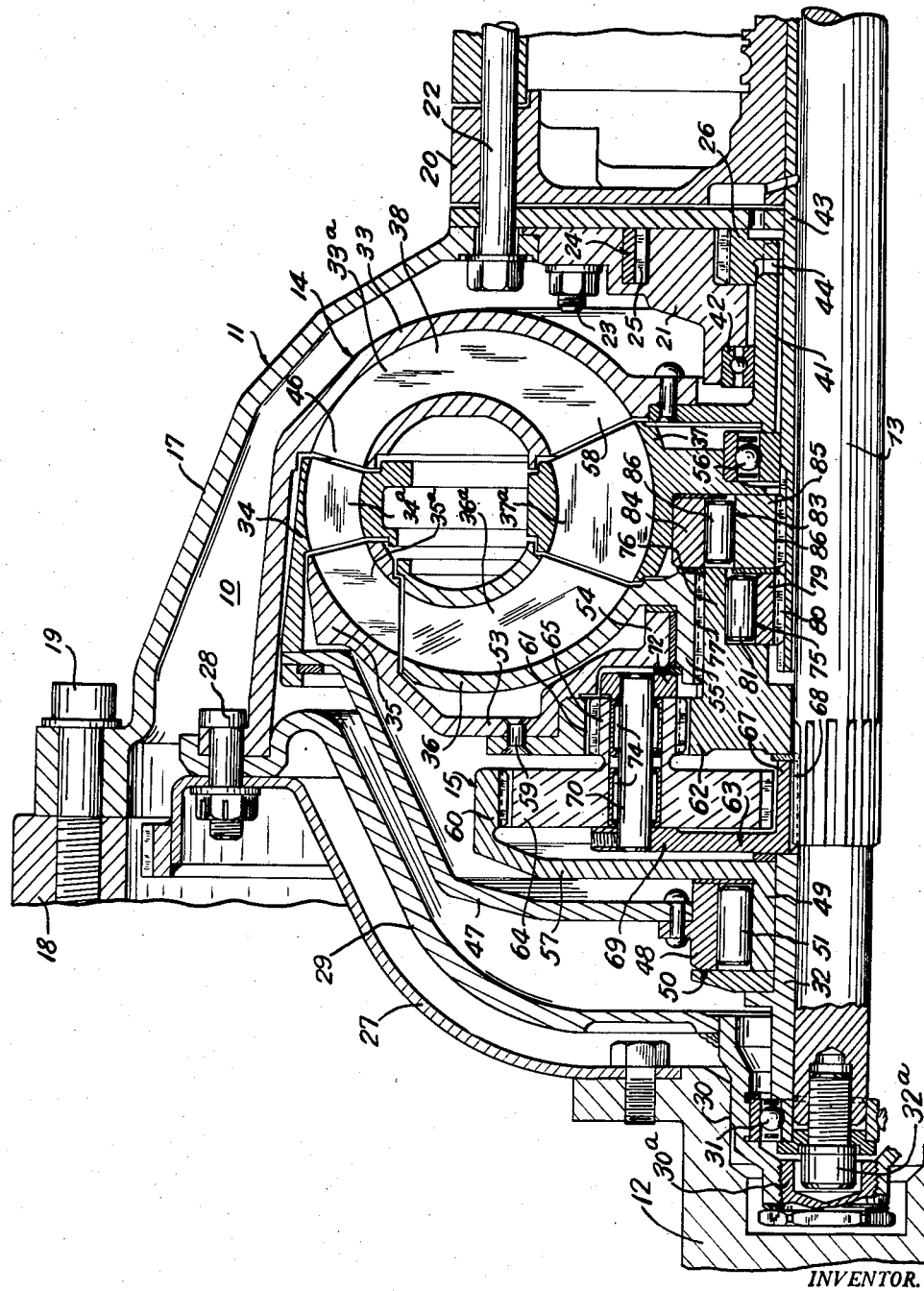
Fig. 1 is mainly a vertical axial section showing a transmission of the combined fluid torque converter and mechanical gear train type embodying the present invention.

As representing one practical embodiment of the present invention, Fig. 1 shows the novel transmission mechanism 10 as comprising in general a stationary outer housing 11 having substantially coaxially aligned rotatable input and output shafts 12 and 13, a torque converter unit 14 rotatable in the housing 11 about the common axis of the shafts 12 and 13, and mechanical gearing 15 also located in the housing 11 and operable to connect bladed components of the torque converter unit 14 with the output shaft 13.

The outer housing 11 is represented by a housing member 17 which is here shown as having its forward end attached to a vehicle engine or power unit 18, as by means of screws 19, and its rear end connected with stationary support members 20 and 21 by means of bolts 22 and 23. An oil pump 24 of the gear and crescent type is here shown as being located in the support member 21 and includes an internal ring gear 25 in meshed engagement with a gear 26 which is driven from the torque converter unit 14 in the manner explained hereinafter.

The input shaft 12 can be any available power shaft, such as the rear end of the crank shaft of an internal combustion engine, and carries a bell shaped annular driving flange 27 for connection with the torque converter unit 14. The output shaft 13 projects from the housing 11 at the rear end thereof.

The torque converter unit 14 comprises a group of relatively rotatable bladed annular members 33, 34, 35, 36 and 37 in cooperating relation and defining a toroidal fluid path or circuit 38 interiorly of this unit. The first member of this group is a hollow annular pump member 33 having an annular group of spaced bladed or vanes 33a therein and is adapted to be driven by the input shaft 12 by reason of it being connected with the annular flange 27 of the latter as by means of the bolts 28.

The pump member 33 is provided at the rear end thereof with a hub 41 located substantially on the central axis of the unit 14 and rotatably supported in the stationary member 21 by means of an antifriction bearing 42. The hub 41 of the pump member 33 is disposed around and spaced from a stationary sleeve 43 which extends into the housing 11 from the rear end thereof in a surrounding coaxial relation to the output shaft 13. The rear end of the hub 41 is provided with a toothed portion 44 having a driving connection with the gear 26 of the oil pump 24.

The pump member 33 is also supported adjacent the front end of the unit 14 by a bell shaped support flange 29 of an axial hub 30. The hub 30 is rotatably supported by an antifriction bearing 31 mounted on a sleeve 32 which is coaxial with the output shaft 13 and retained on the latter by a cap screw 32a. The hub 30 has a central opening therein which is closed by a screw plug 30a.

The annular member 34 of the unit 14 is a first or primary turbine, which can also be referred to as a high speed turbine, and is a hollow member containing an annular group of blades or vanes 34a. This first or high speed turbine 34 is the second bladed member of the series and is located immediately adjacent the delivery portion 46 of the pump member 33 to receive the velocity discharge of fluid directly from the latter. The turbine 34 includes a substantially bell shaped support flange 47 by which this turbine is connected with an outer support hub 48. The outer hub 48 is disposed in surrounding relation to an inner hub 49 which is journalled on the sleeve 32 and is connected with, or forms a part of, one of the gear members of the gear means 15 as will be explained hereinafter.

The outer and inner hub members 48 and 49 also form the outer and inner races of a one-way clutch device 50 having an annular group of clutch rollers 51 disposed between such races. The turbine 34 is supported by the one-way clutch device 50 and is rotatable about the axis of the output shaft 13 as will be further explained hereinafter.

The second or secondary turbine 35 is a hollow annular member containing an annular group of blades or vanes 35a. The member 35 is the third bladed member of the series and is located immediately adjacent the first turbine 34 to receive the velocity stream of fluid directly from the latter. This second turbine can also be referred to as a low speed turbine. The turbine 35 includes a generally radially extending annular flange portion 53 which is provided substantially centrally thereof with an axial hub 54. This turbine is supported for rotation by having its hub 54 journalled on a hub 55 of the next adjacent bladed annular member 36.

The bladed annular member 36 of the torque converter unit 14 is a hollow annular member containing an annular group of blades or vanes 36a. The member 36 is the fourth bladed member of the series. As will be further explained hereinafter, this fourth bladed member 36 functions at certain times as a reaction member and at other times as a turbine or runner, and can therefore be referred to either as a reaction member or turbine, or as a combination turbine and reaction member. This bladed member 36 is located immediately adjacent the second turbine 35 and receives the discharged fluid directly from the latter.

The annular member 37 of the unit 14 is a hollow member containing an annular group of blades or vanes 37a and is the fifth bladed member of the series. The member 37 is a main or prime reaction member and is supported for rotation about the output shaft 13 by an antifriction bearing 56 mounted on the stationary sleeve 43. The reaction member 37 is located between the bladed member 36 and the inlet portion 58 of the pump member 33. This prime reaction member receives the velocity fluid directly from the bladed member 36 and returns the same to the pump member 33 through the inlet portion 58 of the latter. The bladed members 36 and 37 can be referred to as twin or two stage reaction members.

The mechanical gear means 15 is a torque amplifying planetary gear means or system which is, at times, referred to as a compound planetary gear system. The planetary gear system 15 includes two power input members, namely, a first ring gear 60 connected with the first turbine 34 and a second ring gear 61 connected with the second turbine 35. The planetary gearing 15 also includes a sun gear 62 lying substantially opposite the second ring gear 61 and a carrier means 63 which is drivingly connected with the output shaft 13.

The first ring gear 60 is carried by an annular flange 57 of the inner hub 49 so as to be rotatably supported by the latter and is adapted to be connected with the first turbine 34 by the clutch device 50. The second ring gear 61 is connected with the annular support flange 53 of the second turbine member 35 as by the rivets 59.

The planetary gearing 15 additionally comprises interconnected planet gears or pinions 64 and 65 of which the planet gear 64 is in meshed engagement with the first ring gear 60. The planet gear 65 is disposed between, and is in meshed engagement with, the second ring gear 61 and the sun gear 62. The two interconnected planet gears 64 and 65 constitute a set of planet gears and, although Fig. 1 shows only one such set of planet gears, it will be understood that there may be a plurality of such sets distributed in an annular group around the carrier means 63.

The carrier means 63 may be of any appropriate construction and is here shown as comprising a body having a central axial hub 67 which is fixed on the forward end of the output shaft 13 by the splined connection 68. The body of the carrier 63 is represented by axially spaced flange and ring portions 69 and 72 of which the flange portion 69 is connected with the hub 67. The carrier 63 also comprises one or more pivot shafts 70 extending substantially parallel to the output shaft 13 and having their ends mounted in the flange and ring portions 69 and 72.

The planet gears 64 and 65 are of suitable diameters in relation to their associated ring gears 60 and 61, such that their meshed engagement with the ring gears will provide different desired gear ratios for the respective turbines 34 and 35. The planet gears 64 and 65 are here shown as being integrally connected in a substantially coaxially extending relation and are rotatably supported by one of the pivot shafts 70. In this instance, the planet gears 64 and 65 are mounted on the pivot shaft 70 by means of needle bearings 74.

The sun gear 62 is supported by the stationary sleeve 43 and is inhibited against reverse rotation by a one-way brake device 75. The sun gear is preferably provided with an axial hub portion 76 which forms the outer race of the one-way brake device 75 and also forms a support for the hub 55 of the fourth bladed member 36. The bladed member 36 is directly connected to the sun gear 62 for forward rotation therewith by means of a splined engagement 77 provided between the hubs 55 and 76.

The one-way brake device 75 also includes an inner race 79 having a splined connection 80 with the stationary sleeve 43, and an annular group of rollers 81 disposed between the outer and inner races 76 and 79. The one-way brake device 75 permits a simultaneous or conjoint forward rotation of the bladed member 36 and the sun gear 62, but prevents reverse rotation of these members.

The prime reaction member 37 is free to rotate in a forward direction independently of the gear means 15 but is inhibited against reverse rotation by a one-way brake device 83. This one-way brake device comprises outer and inner races 84 and 85 and an annular group of rollers 86 disposed between these races. The outer race 84 is suitably secured to the reaction member 37 and the inner race 85 is secured on the stationary sleeve 43 by splined connection 86 provided therebetween.

From the above description of the transmission 10 it will be seen that the bladed annular members 33, 34, 35, 36 and 37 are in a series relation and are traversed in succession in the order named by the fluid of the toroidal fluid circuit 38.

The ring gears 60 and 61 and their associated planet gears 64 and 65 can be of any appropriate pitch diameters and, for example, may provide torque amplifying gear ratios of 2.40 to 1.0 and 1.64 to 1.0. With appropriate blade shapes and angles for the members and with the sun gear 62 and the reaction member 37 held against reverse rotation by their respective brake devices 75 and 83, the torque converter 14 can readily produce a torque amplification by fluid action of 1.6 to 1.0 or greater during the starting or stall condition of operation. From these values it will therefore follow that the total or overall torque amplification of the transmission 10 at the stall condition will be 2.4×1.6 or a 3.84 to 1.0 ratio.

During the starting or stall condition of operation of the transmission 10, the first turbine 34 is connected with the ring gear 60 through a locked condition of the one-way clutch device 50 such that torque will be supplied through the gearing 15 to the output shaft 13 at the overall torque amplifying ratio of 3.84 to 1.0. This is a very effective torque delivery which is highly desirable for starting heavy loads and for rapid initial acceleration.

As the vehicle picks up speed and the second turbine 35 starts its forward drive and progressively assumes more and more of the torque load, the overall ratio progressively diminishes both in the fluid action and in gearing 15 wherein the second ring gear 61 and its associated planet gear 65 have become effective. The operation of the transmission ultimately reaches the point where the turbine 35 has assumed substantially the full torque load and with the torque being transmitted through the planet gear 65 substantially independently of the first turbine 34 and the planet gear 64. When this operating condition is reached, the amplification ratio will be a value somewhat greater than 1.64 to 1.0, of which a smaller component will be some remaining fluid action amplification.

During the above-explained operation of the transmission 10, the fourth bladed member 36 initially functions as a reaction member, at which time it is held against reverse rotation by the brake device 75 and supplements the reaction function of the member 37. Gradually the function of the member 36 changes from that of reaction member to a forward driving turbine member and then imparts forward rotation to the sun gear 62. Eventually, the gear system 15 rotates as a unit and any overall torque amplification then remaining is derived only from the prime reaction member 37 being held against reverse rotation by the brake device 83. From the action just described it will be seen that the twin reaction members 36 and 37 provide torque amplificaiton over a relatively long operating range.

Finally, the prime reaction member 37 will rotate in a forward direction with the other bladed members and, at that time, all torque amplification will have disappeared and the bladed members 34, 35 and 36 will then be operating as coupling members or runners and the transmission ratio between the input and output shafts 12 and 13 will be substantially a 1.0 to 1.0 ratio. The independent brake device 83 of the prime reaction member 37 permits this member to rotate in the forward direction independently of the gearing 15 and to start such forward rotation at the most favorable time, which need not necessarily be in the sequence used in the above explanation.

Whenever the output shaft 13 is being driven by the vehicle, the bladed members 35 and 36 will be rotated thereby in a forward direction through the gearing 15 as a coupling means, causing these members to act as impellers for forcing fluid through the pump member 33. The latter member is directly connected with the vehicle engine, and hence, the engine is made to assume a braking function for checking vehicle momentum.

Fig. 2 of the drawings shows a transmission mechanism 90 which is of the same general type as the above-described transmission 10, but in which the mechanical gear means 91 is located adjacent to but outside of the stationary housing 92 of the mechanism. An important advantage obtainable by locating the mechanical gear means outside of the stationary housing 92 is that the stationary housing can then be of a relatively smaller size and axial length, requiring a correspondingly smaller hump in the vehicle floor and causing less encroachment into the passenger space of the vehicle.

The transmission mechanism 90 includes a torque converter unit 93 which is rotatable in the stationary housing 92 about an output shaft 94 and is generally similar to the above-described torque converter unit 14 in that it comprises the same number of cooperating rotatable bladed annular members in the same general arrangement and functioning in substantially the same manner. These bladed annular members are designated by the same reference characters as those applied to the corresponding bladed members of the unit 14.

The mechanical gearing 91 is a compound planetary gear system comprising first and second ring gears 95 and 96, a sun gear 97, and one or more sets of interconnected planet gears or pinions 98 and 99 having meshed engagement with the first and second ring gears 95 and 96 respectively. The sun gear 97 is here shown as located substantially opposite the second ring gear 96 and the planet gear 99 is in meshed engagement with the sun gear as well as with the second ring gear. The sun gear includes an axial sleeve portion 100 and is rotatably journalled on the output shaft 94.

The planetary gear system 91 also includes a carrier means 101 having a hub portion 102 drivingly connected with the output shaft 94 by a splined engagement 103 provided therebetween. The carrier means 101 also comprises pivot shafts 104 rotatably supporting one set of the planet gears 98 and 99. The planet gears 98 and 99 are, in this instance, interconnected with each other by means of a one-way clutch 105 provided therebetween.

The pump member 33 of the torque converter unit 93 is rotatably supported by a hub 107 thereof journalled on a stationary sleeve projection 108 of the housing 92 and is adapted to be driven by any suitable power input means connected to the annular flange 109. The primary and secondary turbine 34 and 35 are rotatably supported by sleeves 110 and 111 thereof which are disposed in a journalled relation surrounding the output shaft 94 and are connected with the first and second ring gears 95 and 96 through these sleeves. The fourth bladed member 36 is rotatably supported by a sleeve 112 and is connected through the latter with the sun gear 97. The sleeves 110, 111 and 112 are provided at the rear end thereof with coaxially disposed, nested hollow enlargements 115a, 115b and 115c. The ring gears 95 and 96 are carried by the enlargements 115a and 115b. The rear end of the enlargement 115c is provided with an axial hub 113 and the third turbine 36 is connected with the sun gear 97 by a splined engagement 114 provided between this hub and the axial sleeve projection 100 of the sun gear.

The hub 113 also forms the inner race of a one-way brake device 116 whose outer race 117 is disposed around and located substantially opposite this hub. The brake device 116 also comprises an annular group of rollers 118 disposed between the hub 113 and the outer race 117. This one-way brake device 116 permits conjoint forward rotation of the fourth bladed member 36 and the sun gear 97, but inhibits reverse rotation of such fourth member and sun gear.

A friction brake means 120 is preferably provided for preventing forward rotation of the sun gear 97 and the fourth bladed member 36. The brake means 120 comprises a brake drum 121 having a splined connection 122 with the sleeve 100 of the sun gear and a brake band 123 disposed around and frictionally engageable with the brake drum.

The prime reaction member 37 is freely rotatable in a forward direction about the stationary sleeve 108 but is inhibited against reverse rotation by a one-way brake device 125. The brake device 125 comprises an annular group of rollers 126 disposed between the stationary sleeve 108 and a race 127 carried by the reaction member 37.

The operation and torque amplifying ratios of the transmission 90 are similar to what has been explained above in detail for the transmission 10 but with certain variations therefrom. One such difference in operation is that the one-way clutch 105 between the planet gears 98 and 99 permits the second turbine member 35 to take over the torque load with substantially no interference or drag from the first turbine 34. Another such difference is that the friction brake device 120, when engaged, prevents rotation in the forward direction for both the sun gear 97 and the fourth member 36, thus causing an overdrive action between the carrier 101 and the second turbine 35 as an impeller. A fluid braking action for the vehicle is thus obtained, as well as an engine braking action of increased effectiveness.

Fig. 3 of the drawings shows a transmission mechanism 130 which is of the same general type as the above described transmissions 10 and 90 but which is of a somewhat simplified form with respect to the number of bladed components contained therein. The transmission 130 includes a stationary outer housing (not shown), as torque converter unit 132 rotatable in such housing, and mechanical gearing 133 for connecting bladed elements of the unit 132 with an output shaft 134.

The torque converter unit 132 comprises a group of cooperating relatively rotatable bladed annular members 135, 136, 137 and 138 defining a toroidal fluid path or circuit 139. The first bladed member of the series is a pump member 135 which is supported for rotation by having a central axial hub 140 journalled on a stationary sleeve 141 coaxially surrounding the output shaft 134. The pump member 135 is driven by a rotatable power input means which is here shown as comprising an input shaft 143 and a rotatable head 144 connected with such shaft and having an annular cylinder 145 therein.

The output shaft 134 is rotatable relative to the input shaft 143 and carries a clutch plate 146 which is fixed thereon by a spline connection 142. This clutch plate has an annular friction portion 147 adapted to be pressed against the rear wall 148 of the rotatable head 144 by an annular piston 149 operable in the annular cylinder 145. Pressure fluid is adapted to be supplied to the annular cylinder 145 through passages 151 and 152 of the output shaft 134 and the rotatable head 144, and when the friction portion 147 is pressed against the wall 148 by the annular piston 149, the output shaft 134 is connected with the input shaft 143 for direct drive by the latter.

The bladed annular member 136 is a first or primary turbine member which can also be referred to as a high speed turbine. The bladed annular member 137 is a second or secondary turbine member which can also be referred to as a low speed turbine. The member 138 is the fourth bladed annular member of the series and serves as a reaction member.

The mechanical gearing 133 is a compound planetary gear system comprising first and second ring gears 155 and 156, a sun gear 157, and interconnected planet gears or pinions 158 and 159. The planetary gearing 133 also comprises a planet gear carrier 160 having one or more pivot shafts 161 rotatably supporting the planet gears 158 and 159 and also having an axial hub 162. The carrier 160 is drivingly connected with the output shaft 134 by a splined connection 163 provided between this shaft and the hub 162.

The first ring gear 155 is connected with an axial hub 164 by an annular flange 153 of the latter and is rotatably supported by a journal portion 165 of the output shaft 151 on which the hub 164 is mounted. The first turbine 136 is supported by a dished annular flange 166 having an axial hub 167 which is rotatable about the axial hub 164. The hubs 164 and 167 form the inner and outer races of a one-way clutch device 168 through which the first turbine 136 is connected with the first ring gear 155. The one-way clutch device 168 also includes an annular group of rollers 169 disposed between the inner and outer hubs 164 and 167.

The sun gear 157 is rotatably mounted on the output shaft 134 by a suitable bushing 170 and includes an axial sleeve projection 171. The second turbine 137 is provided with an axial hub 172 and is rotatably supported by the sleeve projection 171 of the sun gear 157 on which the hub 172 is rotatable. The second ring gear 156 is suitably attached to the second turbine 137 as by means of screws 174.

The reaction member 138 is rotatably mounted on the stationary sleeve 141 by an antifriction bearing 175 and is freely rotatable in a forward direction conjointly with the sun gear 157. Reverse rotation of the reaction member 138 and of the sun gear 157 is inhibited by a single one-way brake device 176 through which the reaction member is directly connected with the sun gear.

The one-way brake device 176 comprises an inner race 177 secured on the stationary sleeve 141 by a splined connection 178 and an outer race 179 suitably secured to a reaction member 138. The brake device 176 also includes an annular group of rollers 180 disposed between the inner and outer races 178 and 179. The connection of the reaction member 138 with the sun gear 157 is here shown as being formed by an annular group of axially projecting fingers 182 formed on the sleeve portion 171 of the sun gear and extending into the raceway of the brake device 176 between the pairs of adjacent rollers 180.

In the transmission 130 the bladed annular members 135, 136, 137 and 138 are disposed in a series relation and are traversed in succession in the order named by the fluid of the toroidal fluid circuit 139. The first or high speed turbine 136 receives the fluid directly from the discharge portion 182 of the pump member 135 and drives the planet gear 158 through the one-way clutch 168 and the ring gear 155. The second turbine 137 drives the planet gear 159 through the ring gear 156. The fourth bladed member 138 returns the fluid to the inlet portion 183 of the pump member 183.

During the starting or stall condition of operation of the transmission 130, the bladed member 138 functions as a reaction member and is then held against reverse rotation by the brake device 176. With appropriate blade shapes and angles for the bladed members, the fluid action in the torque converter unit 132 at the stall condition will be such as to produce a torque amplification ratio of approximately 1.6 to 1.0. If it is assumed that the planetary gear trains for the first and second turbines 136 and 137 have 2.4 to 1.0 and 1.64 to 1.0 torque amplifying ratios respectively, then the maximum torque amplifying ratio at the stall condition would be $2.4 \times 1.6 = 3.84$ to 1.0.

As the rotation speed of the output shaft 134 increases, the torque being delivered by the first turbine 136 will decrease progressively and the torque delivery of the second turbine 137 will be progressively increased. Subsequently, the function of the member 138 changes from that of a reaction member to a forward drive turbine member, whereupon it drives the sun gear 157 through the brake device 176. Ultimately, the member 138 will rotate at substantially the same forward speed as the other bladed members and will then be functioning merely as a runner or coupling member and, at that time, substantially all torque amplification will have ceased and the input and output shafts will be rotating at a substantially 1.0 to 1.0 ratio.

Engine braking of vehicle momentum will be available through the direct-drive connection provided by the friction clutch means 147 when the latter is engaged, and will also be available through the torque converter unit 132 when the first and second turbines are driven through the planetary gearing 133 from the output shaft 134 as impellers.

From the accompanying drawings and the foregoing detailed description it will now be understood that the multipleturbine transmissions of this invention provide a practical and satisfactory means for obtaining a desired high value of torque in the output shaft during the stall or starting condition, as well as a variable torque amplification over a relatively wide range of operating speeds, such that these transmissions are well suited for automobile use for obtaining rapid acceleration and for use in trucks or the like where high torque is needed for starting heavy loads. Likewise it will be seen that the mechanical gearing contributes to the achievement of these desirable characteristics of high stall torque and wide operating range by the use of a double or dual planetary gear means which has been disclosed herein in the form of compound planetary gearing having interconnected planetary gear trains associated with a plurality of the turbine members of the torque converter unit.

Although the novel transmission mechanisms have been illustrated and described herein to a somewhat detailed extent, it should be understood that the invention is not to be regarded as being limited correspondingly in scope, but includes all changes and variations coming within the terms of the claims hereof.

Having thus described my invention, I claim:

1. In a power transmission; a group of cooperating relatively rotatable bladed annular members defining a toroidal fluid circuit and including pump means, primary and secondary turbines, and a fourth such bladed annular member inhibited against reverse rotation; said members being disposed in a series relation to be traversed in succession in the order named by the fluid of said circuit with said fourth bladed member located immediately contiguous to said secondary turbine to receive the fluid directly from the latter; rotatable power input means connected with said pump means; rotatable output means; a planetary gear system including a sun gear means inhibited against reverse rotation and a planet carrier means and of which the latter is drivingly connected with said output means; said gear system also comprising interconnected planetary gear trains including planet gears on said carrier means and ring gears connected to be driven by said primary and secondary turbines; said planet gears having meshed engagement with said ring gears and said sun gear means, and said gear trains providing for the transmission of torque from said turbines to said output means at different ratios through said carrier means; and means connecting said fourth bladed member with said sun gear means for forward rotation therewith.

2. In a power transmission; a group of cooperating relatively rotatable bladed annular members defining a toroidal fluid circuit and including pump means, primary and secondary turbines, and a fourth such bladed annular member; said members being disposed in a series relation to be traversed in succession in the order named by the fluid of said circuit with said fourth bladed member located immediately contiguous to said secondary turbine to receive the fluid directly from the latter; rotatable power input means connected with said pump means; rotatable output means; a planetary gear system including a sun gear means and a planet carrier means and of which the latter is drivingly connected with said output means; said gear system also comprising interconnected planetary gear trains including planet gears on said carrier means and rings gears connected to be driven by said primary and secondary turbines; said planet gears having meshed engagement with said ring gears and said sun gear means, and said gear trains providing for the transmission of torque from said turbines to said output means at different gear ratios through said carrier means; means connecting said fourth bladed member with said sun gear means for forward rotation therewith; and means for inhibiting reverse rotation of said fourth bladed member and sun gear means.

3. In a power transmission; a group of cooperating relatively rotatable bladed annular members defining a toroidal fluid circuit and comprising pump means, first and second turbines, and a fourth such bladed annular member inhibited against reverse rotation; said members being disposed in a series relation to be traversed in succession in the order named by the fluid of said circuit with said fourth bladed member in immediately adjacent relation to said second turbine to receive fluid directly from the latter; rotatable power input means connected with said pump means; rotatable output means; and compound planetary gearing comprising interconnected gear trains operably connecting said first and second turbines with said output means for transmission of torque to the latter at different ratios and including planet gear carrier means having a direct drive connection with said output means and a sun gear means inhibited against reverse rotation; said gear trains comprising ring gear means driven by said turbines, and planet gear means on said carrier means and having meshed engagement with said ring gear means and said sun gear means; said fourth bladed member being connected with said sun gear means for forward rotation therewith.

4. In a power transmission; a group of cooperating relatively rotatable bladed annular members defining a toroidal fluid circuit and comprising pump means, first and second turbines, and a fourth such bladed annular member inhibited against reverse rotation; said members being disposed in a series relation to be traversed in succession in the order named by the fluid of said circuit with said fourth bladed member in immediately adjacent relation to said second turbine to receive fluid directly from the latter; rotatable power input means connected with said pump means; rotatable output means; compound planetary gearing comprising interconnected gear trains operably connecting said first and second turbines with said output means for transmission of torque to the latter at different ratios and including a sun gear means and planet gear carrier means having a direct drive connection with said output means; said gear trains comprising ring gear means driven by said turbines, and planet gear means on said carrier means and having meshed engagement with said ring gear means and said sun gear means; means connecting said fourth bladed member with said sun gear means for forward rotation with the latter; and brake means for inhibiting reverse rotation of said sun gear means.

5. In a power transmission; a group of cooperating relatively rotatable bladed annular members defining a toroidal fluid circuit and comprising pump means, first and second turbines, and a fourth such bladed annular member inhibited against reverse rotation; said members being disposed in a series relation to be traversed in succession in the order named by the fluid of said circuit with said fourth bladed member in immediately adjacent relation to said second turbine to receive fluid directly from the latter; rotatable power input means connected with said pump means; rotatable output means; a first ring gear connected with said first turbine; a second ring gear connected with said second turbine; sun gear means inhibited against reverse rotation; said fourth bladed member being connected with said sun gear means; carrier means drivingly connected with said output means; and two interconnected planet gears supported by said carrier means and having meshed engagement with the respective ring gears and at least one of said planet gears having meshed engagement with said sun gear means.

6. A power transmission is defined in claim 5 in which said planet gears are interconnected by a one-way clutch means providing for relative rotation between said planet gears.

7. In a power transmission; a group of cooperating relatively rotatable bladed annular members defining a toroidal fluid circuit and comprising pump means, first, second and third turbines, and reaction means inhibited against reverse rotation; said members being disposed in a series relation to be traversed in succession in the order named by the fluid of said circuit; rotatable power input means connected with said pump means; rotatable output means; ring gears connected with said first and second turbines; sun gear means inhibited against reverse rotation; said third turbine being connected with said sun gear means; carrier means drivingly connected with said output means; and planet gear means supported by said carrier means and having meshed engagement with said sun gear means and said ring gears and providing for the delivery of torque at different ratios from said first and second turbines to said output means through said carrier means.

8. In a power transmission; a group of cooperating relatively rotatable bladed annular members defining a toroidal fluid circuit and comprising pump means, first, second and third turbines, and reaction means inhibited against reverse rotation; said members being disposed in a series relation to be traversed in succession in the order named by the fluid of said circuit; rotatable power input means connected with said pump means; rotatable output means; ring gears connected with said first and second turbines; sun gear means; carrier means drivingly connected with said output means; said third turbine having a forward drive connection with said sun gear means; brake means for inhibiting reverse rotation of said sun gear means; and planet gear means supported by said carrier means and having meshed engagement with said sun gear means and said ring gears and providing different gear ratios for the delivery of torque from said first and second turbines to said output means through said carrier means.

9. In a transmission mechanism; an outer housing; a group of relatively rotatable bladed annular members located in said housing in a cooperating relation defining a toroidal fluid circuit and comprising pump means, first, second and third turbines and reaction means; said members being disposed in a series relation to be traversed in succession in the order named by the fluid of said circuit; rotatable power input means connected with said pump means; rotatable output means; a stationary sleeve extending into said housing substantially coaxially of said group; one-way brake means effective between said sleeve and said reaction means for inhibiting reverse rotation of the latter; carrier means in said housing and drivingly connected with said output means; and compound planetary gearing in said housing for transmission of torque at different ratios from said first and second turbines to said output means through said carrier means and comprising ring gears connected with said first and second turbines, a sun gear means inhibited against reverse rotation and planet gear means supported by said carrier means and having meshed engagement with said sun gear means and said ring gears; said third turbine being connected with said sun gear means for forward rotation therewith.

10. Transmission mechanism as defined in claim 9 in which said carrier means and planetary gearing are located exteriorly of said housing.

11. In a transmission mechanism; a group of relatively rotatable bladed annular members defining a toroidal fluid circuit and including pump means, first and second turbines, and reaction means inhibited against reverse rotation; said members being disposed in a series relation to be traversed in succession in the order named by the fluid of said circuit; rotatable power input means connected with said pump means; rotatable output means; ring gears connected with said first and second turbines; sun gear means inhibited against reverse rotation; carrier means drivingly connected with said output means; planet gear means supported by said carrier means and having meshed engagement with said sun gear means and said ring gears; and one-way clutch means in the connection between one of said turbines and the ring gear associated therewith.

12. Transmission mechanism as defined in claim 11 in which said one-way clutch means is located in the connection between said first turbine and its associated ring gear, and in which said second turbine is operable as an impeller by said output means for vehicle braking purposes.

13. In a power transmission; a group of cooperating relatively rotatable bladed annular members defining a toroidal fluid circuit and comprising pump means, first, second and third turbines, and reaction means inhibited against reverse rotation; said members being disposed in a series relation to be traversed in succession in the order named by the fluid of said circuit; rotatable power input means connected with said pump means; rotatable output means; ring gears connected with said first and second turbines; sun gear means inhibited against reverse rotation; said third turbine being connected with said sun gear means; carrier means drivingly connected with said output means; planet gear means supported by said carrier means and having meshed engagement with said sun gear means and said ring gears and providing different gear ratios for the delivery of torque from said first and second turbines to said output means through said carrier means; and one-way clutch means in the connection between said first turbine and the ring gear associated therewith; said second and third turbines being operable as impellers by said output means for vehicle braking purposes.

14. In a power transmission; a group of cooperating relatively rotatable bladed annular members defining a toroidal fluid circuit and comprising pump means, first, second and third turbines, and reaction means inhibited against reverse rotation; said members being disposed in a series relation to be traversed in succession in the order named by the fluid of said circuit; rotatable power input means connected with said pump means; rotatable output means; and compound planetary gearing comprising interconnected gear trains operably connecting said first and second turbines with said output means for transmission of torque to the latter at different ratios and including a sun gear means and a planet gear carrier having a direct drive connection with said output means; said gear trains comprising ring gear means driven by said first and second turbines, and planet gear means on said carrier and having meshed engagement with said ring gear means and said sun gear means; said third turbine having a direct connection with said sun gear means for forward rotation with the latter; and brake means for controlling rotation of said reaction means and said sun gear means.

15. In a power transmission; a group of cooperating relatively rotatable bladed annular members defining a toroidal fluid circuit and comprising pump means, first, second and third turbines, and reaction means inhibited against reverse rotation; said members being disposed in a series relation to be traversed in succession in the order named by the fluid of said circuit; rotatable power input means connected with said pump means; rotatable output means; and compound planetary gearing comprising interconnected gear trains operably connecting said first and second turbines with said output means for transmission of torque to the latter at different ratios and including a sun gear means inhibited against reverse rotation and a planet gear carrier means having a direct drive connection with said output means; said gear trains comprising ring gear means driven by said first and second turbines, and planet gear means on said carrier means and having meshed engagement with said ring means and said sun gear means; said third turbine having a direct connection with said sun gear means for forward rotation with the latter; said second turbine being operable as an impeller by said output means for vehicle braking; and brake means for preventing forward rotation of said third turbine to render the latter effective as a reaction member during said vehicle braking.

16. In a power transmission; a group of cooperating relatively rotatable blade annular members defining a toroidal fluid circuit and comprising pump means, first and second turbines, and reaction means; said members being dispersed in a series relation to be traversed in succession in the order named by the fluid of said circuit; rotatable power input means connected with said pump means; rotatable power output means; and compound planetary gearing comprising interconnected gear trains operably connecting said turbines with said output means for transmission of torque to the latter at different ratios and including a sun gear means and a planet gear carrier having a direct drive connection with said output means; said gear trains comprising ring gear means driven by said turbines, and planet gear means on said carrier and having meshed engagement with said ring gear means and said sun gear means; and a single one-way break means inhibiting reverse rotation of said reaction means and said sun gear means.

References Cited in the file of this patent
UNITED STATES PATENTS
2,795,154    Russell _____ June 11, 1957